(12) United States Patent  
Hrubes

(10) Patent No.: US 7,257,994 B2
(45) Date of Patent: Aug. 21, 2007

(54) MEASURING DEVICE AND METHOD FOR DETERMINING THE POSITION OF AN ELECTRICALLY CONDUCTIVE TEST OBJECT

(75) Inventor: Franz Hrubes, Rotthalmünster (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 11/295,830

(22) Filed: Dec. 7, 2005

(65) Prior Publication Data

US 2006/0082949 A1  Apr. 20, 2006

Related U.S. Application Data

(63) Continuation of application No. PCT/DE04/01705, filed on Jul. 30, 2004.

(30) Foreign Application Priority Data

| Aug. 4, 2003 | (DE) | 103 35 931 |
| Nov. 7, 2003 | (DE) | 103 52 485 |
| Dec. 8, 2003 | (DE) | 103 57 576 |

(51) Int. Cl.
*G01M 15/00* (2006.01)
(52) U.S. Cl. .................................. 73/119 A
(58) Field of Classification Search ............. 73/118.1, 73/119 A, 116, 117.2, 117.3
See application file for complete search history.

(56) References Cited

U.S. PATENT DOCUMENTS

| 5,811,969 | A | 9/1998 | Kyodo |
| 6,237,572 | B1* | 5/2001 | Carrell et al. ............... 123/501 |
| 6,693,787 | B2* | 2/2004 | Kolmanovsky et al. ..... 361/160 |
| 6,762,922 | B2 | 7/2004 | Mednikov et al. |
| 2003/0098686 | A1 | 5/2003 | Mednikov et al. |
| 2003/0184946 | A1* | 10/2003 | Kolmanovsky et al. ..... 361/160 |

FOREIGN PATENT DOCUMENTS

| DE | 252 063 A1 | 12/1987 |
| DE | 198 41 660 A1 | 3/2000 |
| DE | 101 54 383 A1 | 5/2002 |
| DE | 101 41 764 A1 | 6/2002 |

* cited by examiner

*Primary Examiner*—Eric S. McCall
(74) *Attorney, Agent, or Firm*—Alston & Bird LLP

(57) ABSTRACT

Measuring device and method for determining the position of an electrically conductive test object (1) with a noncontacting sensor, in particular an eddy current sensor (2), wherein the test object (1) is adapted for linear reciprocal movement in a predetermined direction. The test object (1) includes a marking (6), and the sensor is arranged transversely to the direction of movement of the test object (1) and at a constant distance from the test object in the region of the marking (6), so that a movement of the test object causes the sensor to produce an at least largely linear signal change over a predetermined measuring range.

13 Claims, 2 Drawing Sheets

MEASURING DEVICE AND METHOD FOR DETERMINING THE POSITION OF AN ELECTRICALLY CONDUCTIVE TEST OBJECT

CROSS REFERENCE TO RELATED APPLICATION

The present application is a continuation of international application PCT/DE2004/001705, filed 30 Jul., 2004, and which designates the U.S. The disclosure of the referenced application is incorporated herein by reference.

BACKGROUND OF THE INVENTION

The present invention relates to a measuring device and a method for determining the position of an electrically conductive test object with a noncontacting sensor, in particular an eddy current sensor, wherein the test object is adapted for linear reciprocal movement in a predeterminable direction.

Measuring devices and methods of the type under discussion have been known from practical operation in a great variety of designs and configurations, for example, from DE 101 41 764 A1; U.S. Pat. No. 6,762,922; and U.S. Patent Publication No. 2003/0098686. Quite generally, such measuring devices and methods are used to define distances, displacements, or positions relative to any electrically conductive test objects. Typical applications of noncontacting displacement measuring sensors, in particular eddy current sensors, include, for example, the positioning of wafer slices in the semiconductor production, the detection of vibrations or bearing oscillations, or the monitoring of air gaps in magnetic bearings. A specific application of noncontacting displacement sensors, to which the invention relates in particular, is the determination of test objects that linearly reciprocate in one direction, for example, the measurement of immersion depths, or the monitoring of piston strokes or cylinder positions.

In the case of the measuring devices of the prior art, the sensor is generally arranged in the extension of the longitudinal axis of the component being detected, and is aligned parallel to same. Because of the linear reciprocal movement of the component, for example, a cylinder piston, the distance between the end face of the cylinder piston and the sensor increases or decreases in accordance with the actual position of the cylinder piston. When an eddy current sensor is used, differently strong eddy currents are induced in the piston as a function of the distance between the piston end face and the sensor, which results in a corresponding output signal on the eddy current sensor. The output signal varies linearly with the position of the piston. In the case of such arrangements, the relatively long structural forms are often problematic, which applies in particular when only a limited space is available for the measuring device.

Such a situation exists in particular in the case of fuel injectors, as are used, for example, in pump-nozzle injection systems or common-rail injection systems. To monitor and regulate the injection, it has been common practice to measure the movement of the injector needle as described above, toward the closing piston. Disadvantageous in this instance is, on the one hand, the long structural form of the fuel injector, which is not needed for the injection itself. This long structural form is mechanically extremely costly and with that cost intensive both in its manufacture and in its maintenance and care. Furthermore, it is disadvantageous that the position measuring of the injector needle is extremely subjected to tolerances, since the usable measuring point is very small, and since it is extremely difficult and possible only with great adjustment efforts to position the sensor in an exact manner.

It is therefore an object of the present invention to provide a measuring device and a method for determining the position of an electrically conductive test object of the initially described type, which make it possible to determine in a very precise manner the position of a test object with simple constructional means and in a compact structural form.

SUMMARY OF THE INVENTION

In accordance with the invention, the foregoing object is accomplished by the provision of a measuring device for determining the position of an electrically conductive test object, which includes a marking on the test object. The sensor is arranged transversely to the direction of movement of the test object and at a constant distance from the measuring object in the region of the marking, so that a movement of the test object causes the sensor to produce a signal change that extends at least largely linearly over a predetermined measuring range.

Furthermore, with respect to a method for determining the position of an electrically conductive test object, the foregoing object is accomplished by providing a marking on the test object, and arranging the sensor transversely to the direction of movement of the test object and at a constant distance from the test object in the region of the marking, so that a movement of the test object causes the sensor to produce a signal change that extends at least largely linearly over a predetermined measuring range.

In accordance with the invention, it has been found that the arrangement of a sensor in the extension of a linearly reciprocating test object is disadvantageous for many applications because of the resultant, extremely long structural form. Furthermore, it has been found that it is possible to eliminate the found disadvantages in an effective manner by providing on the test object a marking that influences the field lines of the sensor. To this end, the invention provides for arranging the sensor transversely to the direction of movement of the test object at a constant distance from the test object in the region of the marking. During the movement of the test object, the marking thus extends differently deep into the range of the electromagnetic field of the sensor, thereby causing on the sensor a signal change that extends at least largely linearly over a predetermined measuring range.

With respect to a constructionally simple realization, the marking could essentially comprise a stepped edge, which would permit a different spacing of the test object from the end face of the sensor on both sides of the edge. On the one side of the edge the distance from the sensor is smaller than on the other side of the edge, where accordingly greater eddy currents are induced. Consequently, during a movement of the test object and, with that, of the edge region in front of the sensor, the eddy current induced in the test object changes as a whole, so that as a function of the position of the test object, the sensor detects differently strong eddy current losses.

In an advantageous manner, the test object could have at least in sections thereof a shape similar to a bar or rod. For many applications, however, a cylindrical configuration of the test object would be especially suitable. The use of the measuring device in an injection system would then permit realizing a constructionally exact guidance of the cylindrical test object in the inlet bore with a very small play, so that the linear movement of the test object occurs always at an exactly constant distance from the end face of the sensor.

In a specific realization, it would be possible to provide two stepped edges on the test object. In particular, it would be possible to configure the two edges such that they define together a recess on the test object. The recess could be limited to a defined range, when viewed in the circumferential direction of the test object. In this case, the test object would need to be aligned such that the recess directly faces the end face of the sensor. As an alternative, it would also be possible to configure the two edges such that the recess defined by the edges on the test object is formed in the sense of an annularly extending groove.

For an optimal utilization of the available measuring range, the width of the recess or groove could approximately correspond to the diameter of the end face of the sensor.

To monitor the time behavior of a fuel injection, preferably in automobile engines, it would be possible and advantageous to couple the test object mechanically with a needle of a fuel injector. By determining the position of the fuel injector in this manner, it would be possible to optimize the injection with the use of suitable control methods such that the best efficiency or a desired behavior of the engine is achieved in all states of operation. To avoid a costly mechanical connection between the test object and the injector needle, it would be possible and even advantageous to construct the test object directly as an injector needle. In other words, it would be possible to provide a marking of the above described type directly on the injector needle.

In another specific realization, it would be possible to couple the test object mechanically with a servo-valve of a fuel injector. Likewise in this instance, it is possible to provide a marking directly on the servo-valve itself.

In a particularly space saving type of construction and to realize an extremely compact structural form, it would be possible to install the sensor in the housing wall of a fuel injector. In this case, one could provide that the sensor is displaceable in a channel formed in the housing wall, so that the end face of the sensor is at least approximately flush with the inner wall of the housing. The exact positioning of the sensor within the channel could be chosen as a function of the material properties of the test object. In this case, the ferromagnetic properties of the material are of special importance.

With respect to a simple evaluation of the position measurement, it would be possible to couple the eddy current sensor in a manner known per se with an electric oscillating circuit. The latter could be adapted to a basic positioning of the test object. In the case of an edge on the test object, one could choose the basic positioning such that the edge of the test object coincides with the center axis of the sensor.

In the case that two edges defining the recess or groove are provided on the test object, a basic positioning of the sensor is also possible exactly between the two edges. When the test object moves from its basic position, the eddy currents induced in the test object will increase. At the same time, energy is withdrawn from the oscillating circuit, and the latter is detuned. Finally, it is possible to provide a corresponding output signal by means of adequately known bridge circuits.

In a particularly unique configuration, two sensors are provided, which are placed in a basic position such that the center axis of one sensor extends over one edge, and the center axis of the second sensor extends over the other edge. Such an arrangement would permit forming a differential signal from the two sensors. In the case of a position change of the test object, the signal of the one sensor becomes smaller, whereas that of the other sensor simultaneously becomes greater, and vice versa. In this manner, the sensitivity doubles, and likewise the temperature stability considerably increases, since the temperature error in the center of the measuring range will cancel out, i.e. when both sensors supply the same signal.

There exist various possibilities of improving and further developing the teaching of the present invention in an advantageous manner. To this end, one may refer to the following description of two preferred embodiments of the invention with reference to the drawings. In conjunction with the description of the preferred embodiments of the invention with reference to the drawings, also generally preferred improvements and further developments of the teaching are explained.

DETAILED DESCRIPTION OF THE PREFERRED EMBODIMENTS

Figure 1:
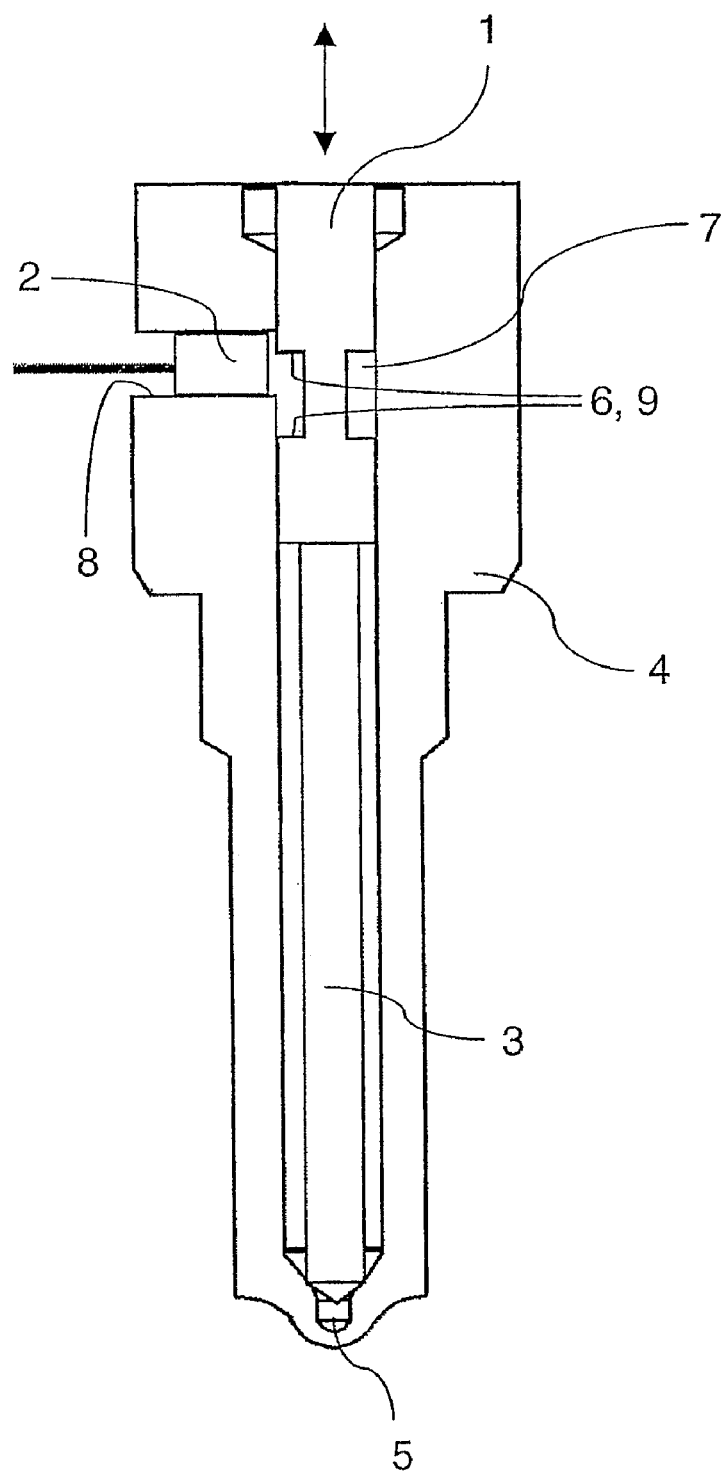
FIG. 1 is a schematic side view of a first embodiment of a measuring device according to the invention for determining the position of an electrically conductive test object when used in a fuel injector.

FIG. 1 illustrates a schematic side view of the first embodiment of a measuring device according to the invention for determining the position of an electrically conductive test object 1. The device comprises an eddy current sensor 2 which is arranged transversely to the direction of movement of the test object 1. The direction of movement of the test object 1 is indicated by a double arrow. Specifically, the movement is the reciprocal movement of an injector needle 3, which mechanically connects to the test object 1. The injector needle 3 forms a part of a fuel injector 4 and releases at a defined time interval a nozzle opening 5, so that fuel is allowed to enter the combustion chamber at a high rate.

To determine the actual position of the injector needle 3, the test object 1 is provided in accordance with the invention with a marking 6, which is formed as a groove 7 that annularly surrounds the test object 1. In accordance with the invention, an eddy current sensor 2 is oriented transversely to the direction of movement of the test object 1 and injector needle 3, and is arranged at a constant distance from the test object 1 in the region of the groove 7. To this end, a channel 8 is provided in the wall of the fuel injector 4, into which the eddy current sensor 2 is inserted. The sensor 2 is positioned such that its end face is essentially flush with the inner wall of the fuel injector 4, and thus almost contacts the test object 1. The constructionally very exact guidance with little play ensures that the linear movement of the injector needle always occurs at the same distance from the end face of the eddy current sensor 2.

The basic positioning of the sensor 2 and the test object 1 is selected such that the center of the measuring range is exactly indicated, when one of edges 9 forming the groove 7 (in the embodiment shown in FIG. 1, the upper one of the two edges 9) coincides with the center axis of the sensor 2. The one end of the measuring range corresponds with the closing position of the injector needle 3, whereas the other end of the measuring range is reached, when the injector needle 3 has fully opened. When the upper one of the two edges 9 is exactly in the center above the sensor 2 or the sensor coil, i.e., when the basic position is reached, the injector needle 3 will have covered half of its total stroke.

When the injector needle 3 moves from its basic position upward, a constantly enlarging portion of the groove 7 will move in front of the sensor 2, so that the eddy currents induced in the test object 1 decrease. Conversely, when the injector needle 3 moves from its basic position downward, a constantly enlarging portion of the groove 7 will move out of the region in front of the sensor 2, so that the induced eddy currents increase. These changes of the induced eddy currents which are detected by the eddy current sensor 2 as a function of the position of test object 1 or injector needle 3, are converted into a corresponding output signal, which extends largely linearly over an adequately large measuring range without additional and in general extremely costly, linearization measures in terms of circuitry or computation. This will suffice to determine with great accuracy the position of edge 9 and, with that, of injector needle 3.

Irrespective of the specific realization of the illustrated fuel injector 4, the measuring principle can be universally applied to a great variety of fuel injectors. In particular, it will not matter, whether the test object 1 with groove 7 is mechanically coupled with the injector needle 3, or whether one uses for measuring an existing edge or groove on the injector needle 3, or an edge or groove specially provided on the injector needle 3 for measuring the position.

Figure 2:
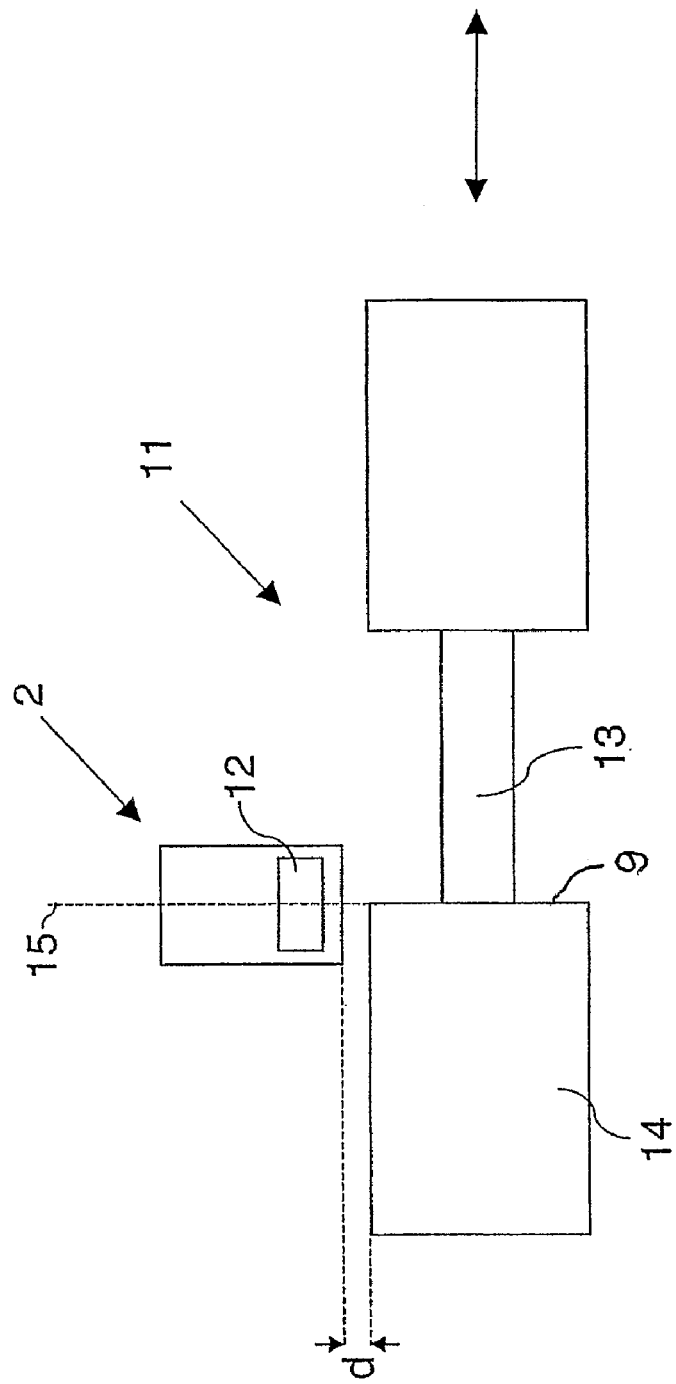
FIG. 2 is a schematic side view of a second embodiment of a measuring device according to the invention, when used in a servo-valve.

FIG. 2 schematically illustrates a side view of a second embodiment of the measuring device according to the invention. The arrangement is basically similar to that of FIG. 1, with like numerals indicating like components. Unlike FIG. 1, the embodiment of FIG. 2, however, does not determine the position of an injector needle, but the position of a servo-valve 11. The servo-valve 11 performs linear movements in the direction indicated by the double arrow. In accordance with the invention, the eddy current sensor 2 with a measuring coil 12 is arranged transversely to the direction of movement of the servo-valve 11 at a constant distance d. The marking toward which a measurement is performed, is defined by the edge 9, which is formed by a transition from a valve stem 13 to a valve housing 14. In the basic position, the edge 9 extends exactly along a center axis 15 of the measuring coil 12. The measuring method for monitoring the valve position is analogous to the method described in connection with FIG. 1.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A measuring device for determining the position of an electrically conductive test object which is mounted for linear reciprocation, comprising
   at least two stepped edges on the test object,
   at least two sensors each arranged transversely to the direction of movement of the test object and at a constant distance from the test object in the region of the stepped edges, so that a movement of the test object causes each sensor to produce a signal change that extends at the least largely linearly over a predetermined measuring range,
   wherein each sensor is an eddy current sensor which defines a center axis, and
   wherein the sensors are arranged in a basic position such that one stepped edge of the test object coincides with the center axis of one sensor, and the other stepped edge of the test object coincides with the center axis of the other sensor.

2. The measuring device of claim 1, wherein the test object has at least in sections thereof a shape similar to a bar or rod.

3. The measuring device of claim 1, wherein the test object is cylindrical.

4. The measuring device of claim 1, wherein the two edges form a recess on the test object which faces each sensor.

5. The measuring device of claim 1, wherein the test object is mechanically coupled with an injector needle of a fuel injector.

6. The measuring device of claim 1, wherein the test object is constructed as an injector needle of a fuel injector.

7. The measuring device of claim 1, wherein the test object is mechanically coupled with a servo-valve of a fuel injector.

8. The measuring device of claim 1, wherein the test object is configured as a servo-valve of a fuel injector.

9. The measuring device of claim 1, wherein each eddy current sensor is coupled with an electric oscillating circuit.

10. The measuring device of claim 1, wherein the two edges form on the test object an annularly extending groove.

11. The measuring device of claim 10, wherein the width of the groove approximately corresponds to the diameter of an end face of each sensor.

12. The measuring device of claim 1, wherein each sensor is installed in a housing wall of a fuel injector.

13. The measuring device of claim 12, wherein each sensor has an end face which is at least approximately flush with an inner side of the housing wall.

* * * * *